US008240361B2

(12) United States Patent
Behrens et al.

(10) Patent No.: US 8,240,361 B2
(45) Date of Patent: Aug. 14, 2012

(54) COMBINED THERMAL PROTECTION AND SURFACE TEMPERATURE CONTROL SYSTEM

(75) Inventors: William W. Behrens, St. Louis, MO (US); Andrew R. Tucker, Glendale, MO (US)

(73) Assignee: The Boeing Company, Chicago, IL (US)

(*) Notice: Subject to any disclaimer, the term of this patent is extended or adjusted under 35 U.S.C. 154(b) by 1088 days.

(21) Appl. No.: 11/556,138

(22) Filed: Nov. 2, 2006

(65) Prior Publication Data

US 2008/0105402 A1    May 8, 2008

(51) Int. Cl.
*F28F 7/02* (2006.01)

(52) U.S. Cl. .................................... 165/80.4; 165/170
(58) Field of Classification Search .............. 165/80.4, 165/80.5, 114, 170
See application file for complete search history.

(56) References Cited

U.S. PATENT DOCUMENTS

| | | | |
|---|---|---|---|
| 4,657,359 A | 4/1987 | Thompson et al. | |
| 5,205,353 A * | 4/1993 | Willemsen et al. | 165/170 |
| 6,405,792 B1 | 6/2002 | Rosenfeld et al. | |
| 6,438,964 B1 * | 8/2002 | Giblin | 62/3.5 |
| 7,055,781 B2 | 6/2006 | Behrens et al. | |
| 2002/0108743 A1 | 8/2002 | Wirtz | |
| 2004/0038029 A1 * | 2/2004 | Zinn et al. | 428/375 |
| 2004/0245373 A1 | 12/2004 | Behrens et al. | |
| 2004/0245389 A1 | 12/2004 | Behrens et al. | |

FOREIGN PATENT DOCUMENTS

WO      99/56899 A    11/1999

OTHER PUBLICATIONS

U.S. Appl. No. 10/457,594, filed Jun. 9, 2003, Behrens et al.

* cited by examiner

*Primary Examiner* — Teresa Walberg
(74) *Attorney, Agent, or Firm* — Klintworth & Rozenblat IP LLC (57) ABSTRACT

The invention relates to a combined thermal protection and surface temperature control apparatus. In one embodiment, a combined thermal protection and surface temperature control apparatus comprises a porous member having an entrance side, and a separate exit side. One or more coolant entrance channels extend through the entrance side, extend part-way through the porous member, and end within the porous member before reaching the exit side. Conversely, one or more coolant exit channels begin within the porous member, extend through a portion of the porous member, and extend through the exit side. The coolant entrance and exit channels may be parallel and may alternate. The channels may only extend across a portion of the thickness of the porous member.

51 Claims, 5 Drawing Sheets

Pressure Drop Comparison

COMBINED THERMAL PROTECTION AND SURFACE TEMPERATURE CONTROL SYSTEM

BACKGROUND OF THE INVENTION

There are a number of thermal control problems which may arise in high heat flux environments, such as those encountered in air breathing engines, during hypersonic flight of aircraft, or in other non-aeronautical applications. The first problem concerns protecting the underlying airframe structure from destruction by the high heat flux via a thermal protection system (TPS). The other problem concerns controlling the temperature of a surface bounding a high velocity flow to a particular level, while that surface is simultaneously being subjected to high heat flux.

Back side cooling, film cooling, and transpiration cooling methods may all potentially deal with both problems in a single design, but may have significant drawbacks. For instance, they may require high coolant flow rates and may depend on the delivery of coolant to be cooled through a heavy, expensive, structural ducting and plenum system. A plenum may have to be provided directly behind any area which requires cooling. A further drawback of film cooling systems may be the expense associated with drilling large numbers of small holes in the surface to be cooled. Transpiration systems may be limited by the ceramic and sintered metal porous materials used for the surface to be cooled. Ceramics may be brittle and may lack structural strength when unsupported by a substrate. Sintered metals may be heavy and expensive.

Some of the prior ceramic foam TPS systems have the foam bonded to the structural member requiring cooling. Coolant may flow through the foam in the plane of the structural member being cooled so that the foam itself becomes the plenum for the cooling air. This method may work well as a TPS system, protecting the bond line with a much smaller amount of coolant than the traditional methods discussed above. However, achieving surface temperature control with this system may be difficult because the pressure loss in the coolant may become prohibitive at the coolant flow rates needed to maintain a given surface temperature.

Other prior art TPS systems may use ceramic foam bonded to a structural plenum. This system may provide good surface temperature control, and may also function as a TPS system. However, it may share a fundamental drawback with the traditional methods previously mentioned. Namely, it may employ a heavy, expensive, structural plenum for delivery of coolant to the surface.

A combined thermal protection and surface temperature control apparatus, and method for its manufacture and use, is needed which may solve or reduce one or more problems associated with one or more of the prior art apparatus.

SUMMARY OF THE INVENTION

In one aspect of the invention, a combined thermal protection and surface temperature control apparatus comprises a porous member comprising an entrance side, and a separate exit side. One or more coolant entrance channels extend through the entrance side, extend part-way through the porous member, and end within the porous member before reaching the exit side. One or more coolant exit channels begin within the porous member, extend through a portion of the porous member, and extend through the exit side.

In another aspect of the invention, a thermally protected, controlled surface temperature apparatus comprises a member requiring thermal protection, and a porous member comprising an attachment side, a separate entrance side, and a separate exit side. One or more coolant entrance channels extend through the entrance side, extend part-way through the porous member, and end within the porous member before reaching the exit side. One or more coolant exit channels begin within the porous member, extend through a portion of the porous member, and extend through the exit side. The attachment side of the porous member is attached to the member.

In a further aspect of the invention, a method of manufacturing a thermal protection, controlled surface temperature apparatus comprises providing a porous member, and manufacturing coolant entrance and exit channels within the porous member. The coolant entrance channel only extends through one side of the porous member, and the coolant exit channel only extends through another side of the porous member.

These and other features, aspects and advantages of the invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
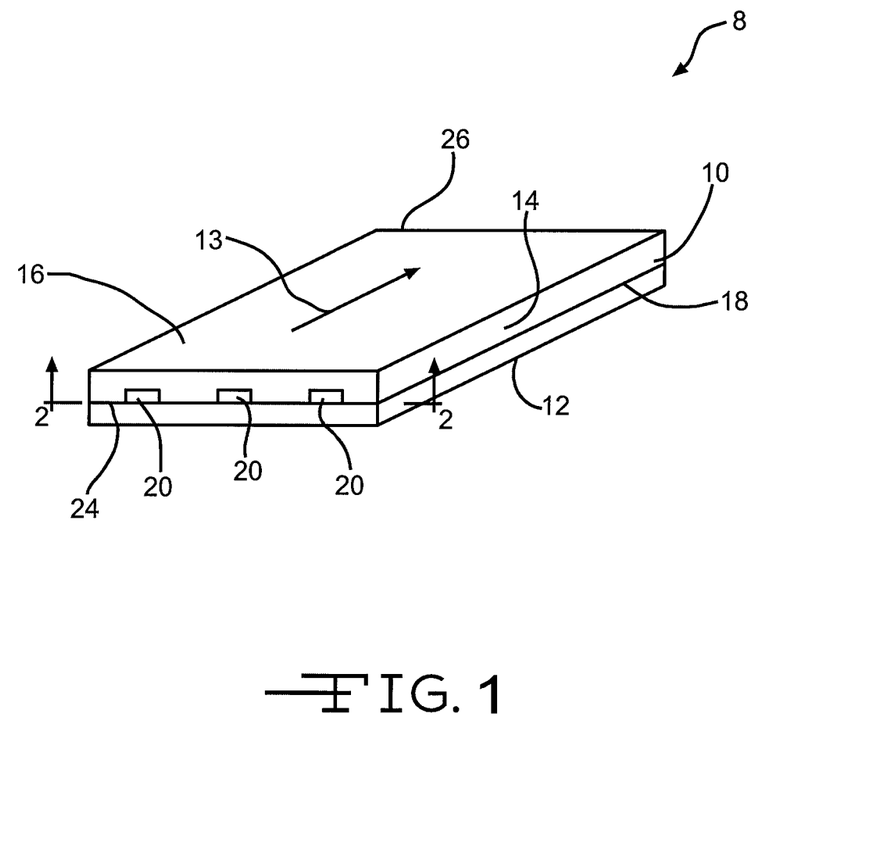
FIG. 1 is a perspective view of a thermally protected apparatus under one embodiment of the invention.

In one embodiment of the invention, as depicted in FIG. 1, a thermally protected, surface temperature controlled apparatus 8 is provided. The thermally protected and surface temperature controlled apparatus 8 may comprise a thermal protection apparatus 10 which has an attachment side 18 which is attached, utilizing a RTV silicone adhesive, to a member 12 to which it is providing thermal protection from an environment hot flow 13. In other embodiments, the thermal protection apparatus 10 may be attached to the thermally protected member 12 utilizing any type of attachment mechanism. The thermally protected member 12 may comprise any type of surface which requires thermal protection, such as a portion of an engine, a portion of a vehicle, a portion of an aircraft, a portion of a spacecraft, and/or other types of surfaces or devices. In still other embodiments, the thermal protection apparatus 10 may be provided on its own, and may be adapted to be attached to a member to provide thermal protection. For purposes of this application, it should be noted that the various provided embodiments may include and/or provide combined thermal protection and surface temperature control to the apparatus 8.

The thermal protection apparatus 10 may comprise a porous member 14. The porous member 14 may comprise a porous foam, such as a ceramic foam. In one embodiment, the porous foam may comprise a high porosity foam having michrochannel pore sizes. The porous foam may comprise a hyperporous, microchannel, alumina silica foam that is lightweight having a density of approximately 16 pounds per cubic foot, a porosity in excess of 80 percent, and pores substantially in the size of 5 to 50 microns. Hyperporous refers to high porosity, which may in one embodiment be 90 percent porosity. Microchannel refers to the pore size, which in one embodiment may be 35 microns. In one embodiment, the foam may comprise a foam made by Boeing known as Boeing Rigid Insulation foam (BRI), which may be similar to the space shuttle thermal tile. This foam may have a density of 16 pounds per cubic foot, a porosity of approximately 90 percent, and pore size of approximately 35 microns. The combination of hyperporosity and very small pores provides a large internal surface area for convection of heat to a coolant flowing through the pores of the porous member 14. In other embodiments, the porous member 14 may comprise a multitude of varying materials, may have varying percentage porosity, may have differing density, may have varying size pores, and/or may have other properties, sizes, or configurations. A top side 16 of the porous member 14 may be coated with an erosion coating to substantially protect it from erosion by the environment hot flow 13.

Figure 2:
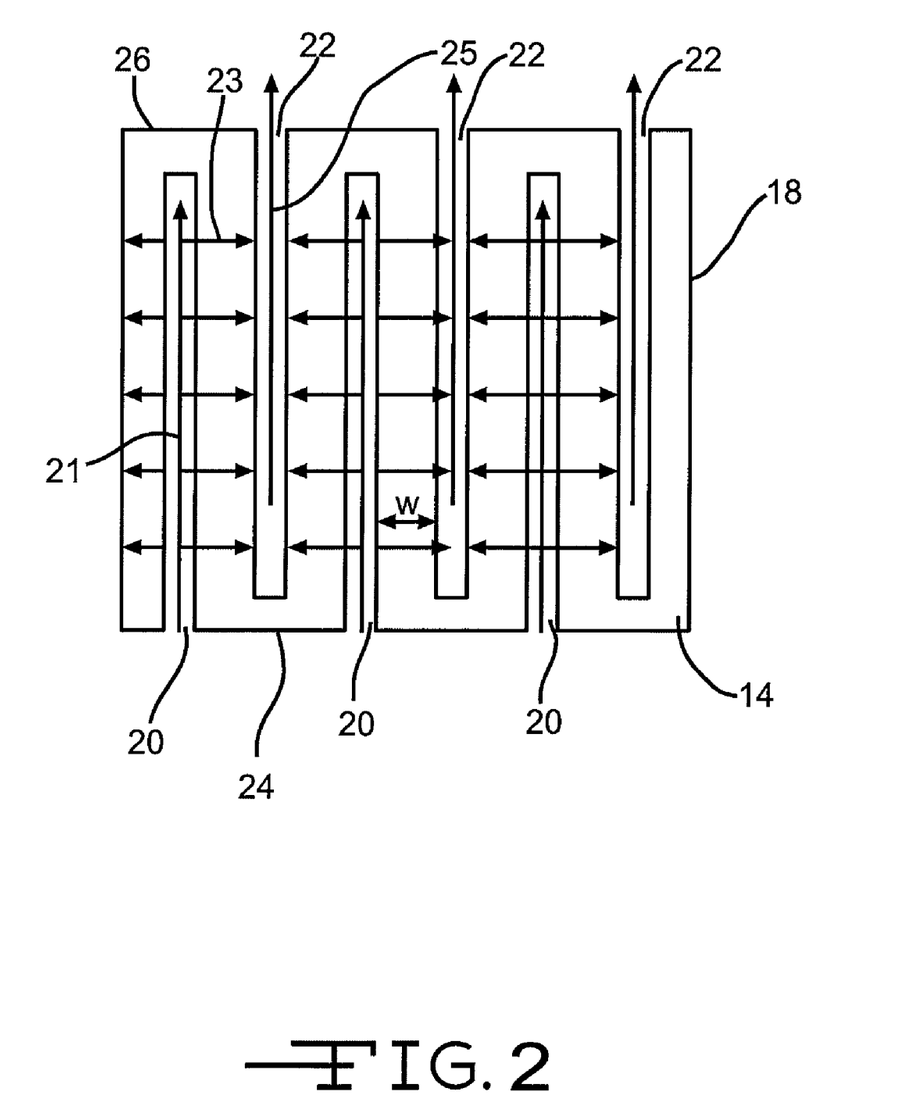
FIG. 2 is a cross-sectional view along line 2-2 of FIG. 1.

FIG. 2 depicts a cross-sectional view along line 2-2 in FIG. 1 showing the bottom attachment side 18 of the porous member 14 with the thermally protected member cut away. As shown in FIGS. 1 and 2, the thermal protection apparatus 10 may have a plurality of coolant entrance channels 20 which are parallel and alternate with respect to a plurality of coolant exit channels 22. The coolant entrance and exit channels 20 and 22 may be equidistant from one-another, or in other embodiments, may be in differing orientations and configurations. The coolant entrance channels 20 may extend through an entrance side 24 of the porous member 14, may extend part-way through the porous member 14, and may end within the porous member 14 prior to reaching an exit side 26 of the porous member 14. Conversely, the coolant exit channels 22 may begin within the porous member 14, may extend through a portion of the porous member 14, and may extend through the exit side 26 of the porous member 14. The coolant entrance and exit channels 20 and 22 may be machined in the porous member 14 or manufactured utilizing any process known in the art.

This arrangement of alternating, parallel, coolant entrance and exit channels 20 and 22, which do not independently span the entire length of the porous member, force coolant, in the form of a liquid or gas such as air, to flow through the entrance channels 20 in a parallel direction 21, through the pores of the porous member 14 in a generally perpendicular direction 23, and through the exit channels 22 in another parallel direction 25. This arrangement of channels 20 and 22, in combination with the relatively short distance that separates them, may provide a low pressure drop path for coolant to enter and exit the porous member 14. In other embodiments, any number of coolant entrance or exit channels 20 and 22 may be utilized in a variety of sizes, shapes, orientations, and/or configurations, extending through various portions of the porous member 14.

Figure 3:
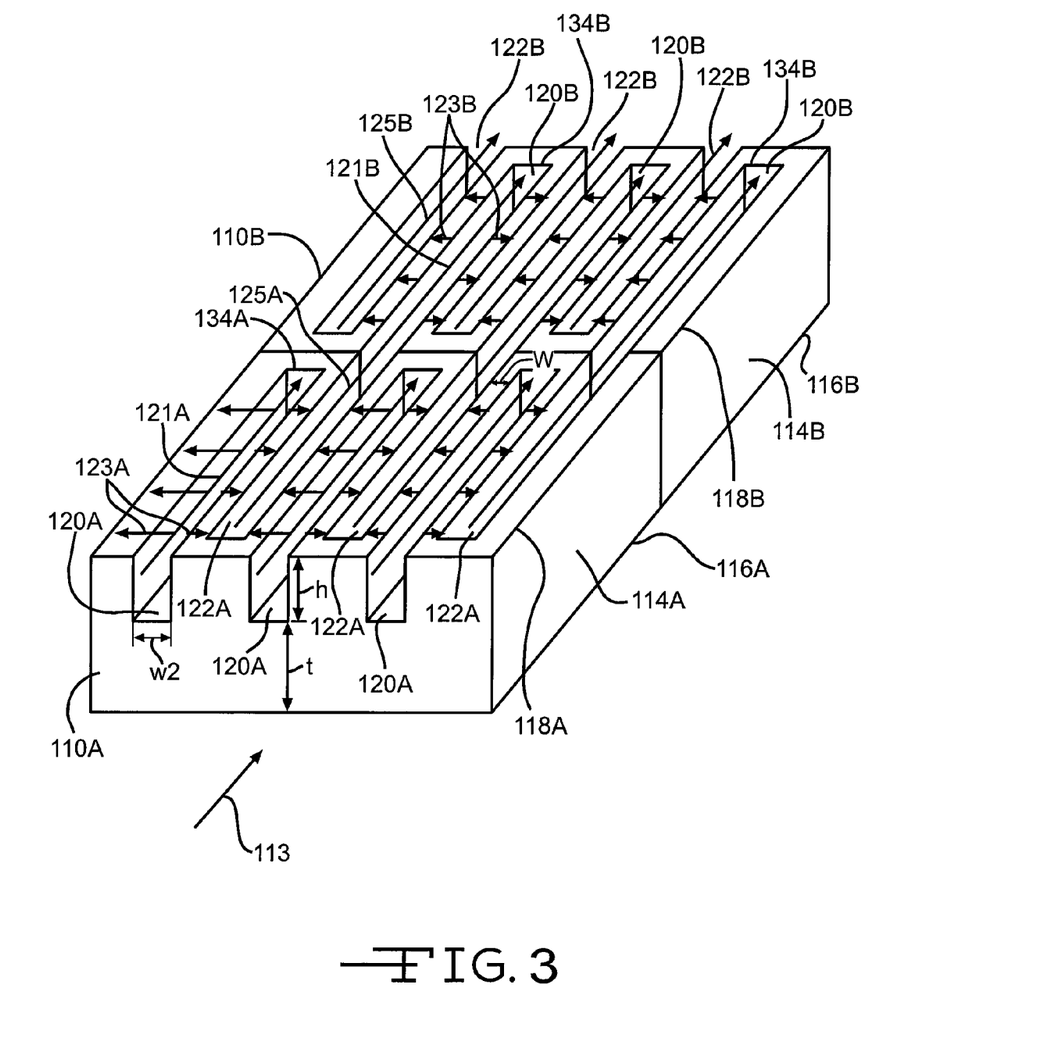
FIG. 3 is a perspective view of two thermal protection apparatus attached together under another embodiment of the invention.

FIG. 3 depicts a perspective bottom view of another embodiment of the invention showing the porous members 114A and 114B of two separate thermal protection apparatus 110A and 110B bonded together, with the thermally protected member removed from the attachment sides 118A and 118B of the porous members 114A and 114B. In other embodiments, any number of thermal protection apparatus 110 may be attached together utilizing differing types of attachment mechanisms. As shown in FIG. 3, the coolant entrance channels 120A of the first thermal protection apparatus 110A may be aligned with the coolant exit channels 122B of the second attached thermal protection apparatus 110B. Similarly, the coolant exit channels 122A of the first attached thermal protection apparatus 110A may be aligned with the coolant entrance channels 120B of the second attached thermal protection apparatus 110B.

When the bottom sides 118A and 118B of the thermal protection apparatus 110A and 110B are attached to a thermally protected member (not shown), a coolant may flow through the coolant entrance channels 120A of the first thermal protection apparatus 110A in a direction 121A. The coolant may comprise a gas and/or a liquid. In one embodiment, the coolant may comprise air. Since the coolant entrance channels 120A of the first thermal protection apparatus 110A may end in side-walls 134A, the coolant may be forced to flow in directions 123A generally perpendicular to the entrance channels 120A of the first protection apparatus 110A. The coolant may enter the coolant exit channels 122A of the first thermal protection apparatus 110A through the pores of the porous member 114A, and may flow in direction 125A through the coolant exit channels 122A of the first thermal protection apparatus 110A, and into the coolant entrance channels 120B of the second attached thermal protection apparatus 110B in direction 121B. Since the coolant entrance channels 120B of the second thermal protection apparatus 110B may end in side-walls 134B, the coolant may be forced to flow in directions 123B generally perpendicular to the coolant entrance channels 120B of the second thermal protection apparatus 110B. The coolant may enter the coolant exit channels 122B of the second thermal protection apparatus 110B through the pores of the porous member 114B, and may flow in direction 125B through the coolant exit channels 122B of the second thermal protection apparatus 110B, and may exit the coolant exit channels 122B and out of the second thermal protection apparatus 110B. In such manner, the coolant may be distributed throughout the first and second thermal protection apparatus 110A and 110B in order to provide thermal protection to an attached thermally protected member (not shown). In other embodiments, any number, alignment, size, type, configuration, and/or orientation of thermal protection apparatus and coolant entrance and exit channels may be utilized to provide thermal protection.

As shown in FIG. 3, in order to control the amount of surface temperature control provided to the member (to which the thermal protection apparatus will later be attached) requiring thermal protection, dimensions h, t, and w of each thermal protection apparatus 110A and 110B may be changed to achieve the desired result. The combination of these design variables may determine coolant pressure drop, hot side 116A and 116B cooling effectiveness and associated surface temperature, and porous member contact area on sides 118A and 118B to the bonding material attaching the member requiring thermal protection. Heat conducted into the solid matrix of the porous members 114A and 114B may be absorbed via convection by the coolant flowing through the pores of the porous members 114A and 114B. Increasing the thickness t of the portion of the porous members 114A and 114B capping the channels 120A and 120B and 122A and 122B may increase the hot side 116A and 116B surface temperatures, thereby resulting in decreased cooling effectiveness at surfaces 116A and 116B. This may occur because the thermal resistance between the hot flow 113 and the coolant may be increased. This increased thermal resistance may have the beneficial effect of decreasing the temperature at the attachment sides 118A and 118B, thereby increasing the thermal protection of the RTV used to bond the apparatus to the member requiring thermal protection.

Conversely, minimizing the thickness t of the portion of the porous members 114A and 114B capping the coolant channels 120A & B and 122A & B may increase the amount of cooling that occurs on the hot side 116A and 116B of the porous members 114A and 114B, thereby lowering the surface temperatures 116A & B and increasing the hot side cooling effectiveness. Increasing the distance w between channels 120A and 122A and between 120B and 122B may increase the distance the coolant travels through the porous members 114A and 114B which may drive up the coolant pressure drop, while decreasing w may have the opposite effect. Minimizing the height h of the channels 120A & B and 122A & B while maintaining the same channel flow area by increasing the width w2 of cooling channels 120A & B and 122A & B, may reduce the contact area between the porous members 114A and 114B and the bonding material attaching the member requiring thermal protection. In such manner, one or more of the dimensions h of the entrance and exit channels 120A & B and 122A & B, a spacing distance w between the entrance and exit channels, and another spacing distance t between the entrance and exit channels and surfaces 116A & B of the porous members may be predetermined based on the amount of thermal protection and surface temperature control required.

Figure 4:
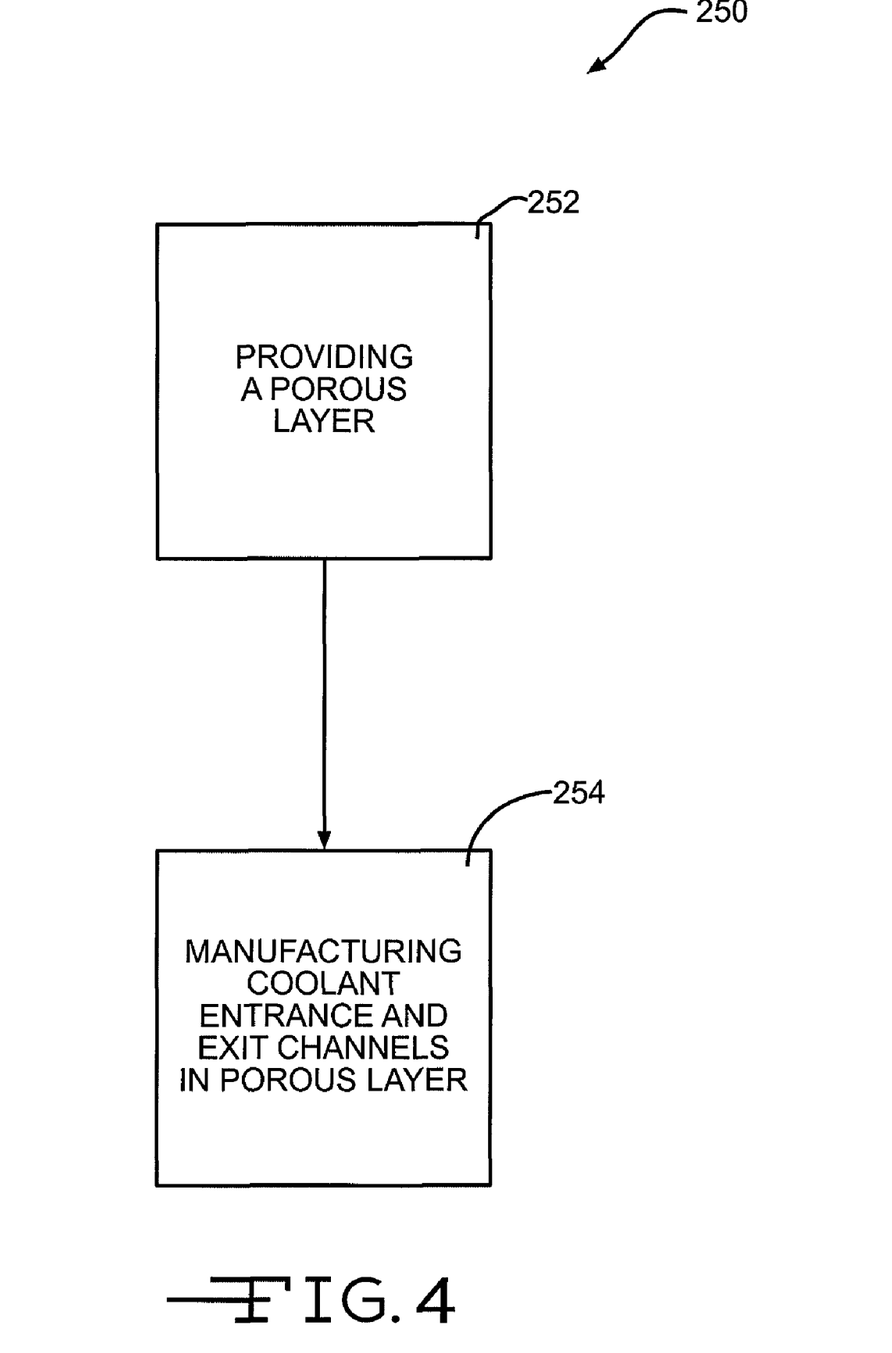
FIG. 4 depicts a method of manufacturing a thermal protection apparatus under another embodiment of the invention.

FIG. 4 depicts a method 250 of manufacturing a thermal protection apparatus. In one step 252, a porous member may be provided. The porous member may comprise a foam or other type of porous material. The foam may have high porosity with microchannel pore sizes, such as BRI foam. In another step 254, coolant entrance and exit channels may be manufactured within the porous member. The coolant entrance channel may only extend through one side of the porous member while the coolant exit channel may only extend through another side of the porous member. The coolant entrance and exit channels may be manufactured to be parallel and to alternate with respect to one another. In other embodiments, varying configurations and orientations may be utilized. Another step of the method may comprise determining a member which requires thermal protection. In one embodiment, this may comprise the first step of the method. The member may comprise a portion of an engine, a vehicle, an aircraft, a spacecraft, or any other type of member requiring thermal protection. Yet another step of the method may comprise determining at least one of a dimension of the entrance and exit channels, a spacing distance between the entrance and exit channels, and another spacing distance between the entrance and exit channels and a surface of the porous member, in order to provide the amount of thermal protection and surface temperature control required. An additional step of the method may comprise attaching the porous member to the member requiring thermal protection. In other embodiments, the method 250 may utilize any of the embodiments disclosed within this specification.

By advantageously utilizing the low thermal conductivity of the BRI along with its desirable cooling performance, surface cooling may be easily tailored. For instance, in an upstream section of one embodiment of the invention, the foam thickness above the channel t may be maximized. The low thermal conductivity of the foam may minimize the amount of heat the coolant absorbs in this region. Reducing the energy absorbed in this upstream region may increase the coolant thermal capacity available for heat absorption farther downstream in the apparatus. To maximize surface cooling in this downstream region, the foam thickness t may be at a minimum. Reducing the foam thickness t may increase the heat absorbed by the coolant which may lower the surface temperature.

The preceding discussion assumes the erosion coating completely or nearly completely seals the coolant inside the foam. Another facet of this invention is that the erosion coating could be made semi-permeable either by tailoring the permeability of the coating itself or by perforating it with small holes, or by doing both in combination. This would allow a surface to be controlled to even lower temperatures than is possible when all of the coolant is confined in the foam by an impermeable erosion coating. Regardless of the path taken by the coolant at the erosion coating, one of the advantages of the invention derives from the low pressure drop coolant transport which may be provided by the use of machined channels. This low pressure drop transport may make the distribution of coolant in quantities necessary for surface temperature control over a large area practical in a system that uses the foam as a plenum, eliminating the need for a separate plenum.

Figure 5:
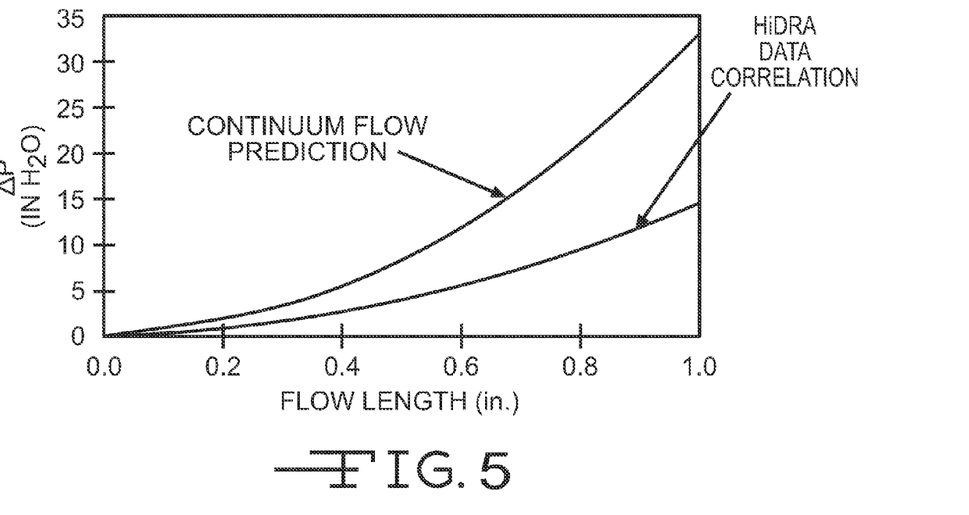
FIG. 5 is a graph comparing pressure differentials at various flow lengths for BRI foam, which may be used under embodiments of the invention.

The small, 35 micron pores found in BRI may cause rarefaction of the flow through the material which may reduce pressure drop. Rarefaction may occur because the flow channel size approaches the mean free path of the individual air molecules in the coolant flow. This means that the flow may no longer be considered as a continuum and instead may be considered in terms of the path of individual particles through a channel. Rarefaction may ultimately result in a non-zero "slip" velocity at the walls bounding a channel and an attendant reduction in pressure drop for the flow, compared to what would be expected for continuum flow and a "no-slip" boundary. This behavior was seen in testing of BRI, as shown in FIG. 5.

Figure 6:
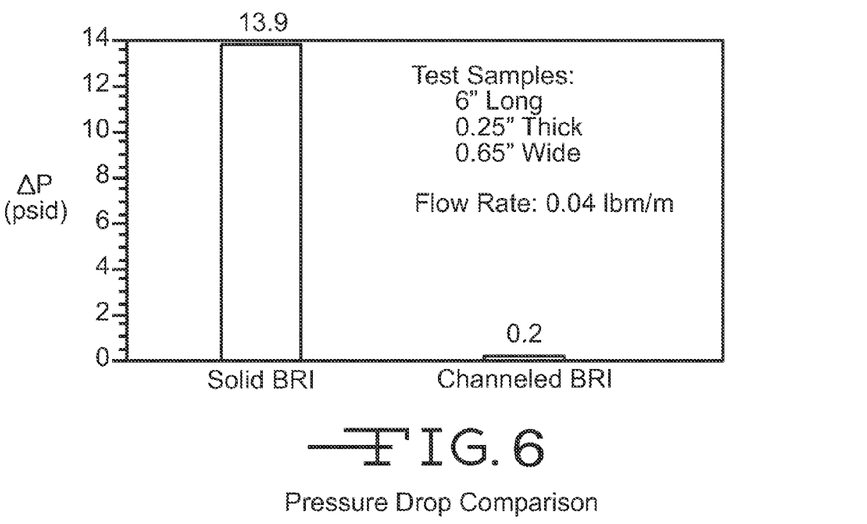
FIG. 6 depicts pressure drop testing results for one embodiment of the invention.

The slip flow produced by rarefaction in the BRI may reduce the pressure drop by 20% to 50% compared to what may be expected under the continuum flow assumption. Furthermore, as the plot indicates, decreasing the length the coolant flows through the foam may dramatically decrease pressure drop. The channeled foam used in one embodiment of the invention makes use of this fact to reduce the coolant pressure drop, compared to one type of conventional system where coolant must flow from entrance to exit longitudinally through a solid foam slab that has no channels. The low pressure drop characteristic of one embodiment of the invention was verified via testing as indicated in FIG. 6. The pressure drop through the channeled BRI was a factor of 70 lower than that of a solid BRI slab with no channels. Therefore, for applications where coolant must be provided to a long distance from the coolant supply plenum (generally on the order of several feet) adequate surface temperature control and thermal protection may be achieved by incorporating the arrangement of machined cooling channels of this invention. Testing has also shown that the invention may produce uniform cooling of the BRI foam, minimizing hot spots. With this channel arrangement, cooling lengths within the foam may be tailored to meet pressure and surface temperature requirements for a given application.

Minimizing the distance between coolant channels may not only reduce coolant pressure drop, but may also reduce the impact surface damage has on the thermal performance of the TPS (thermal protection system). As previously mentioned, an erosion coating may be applied to the outside surface of the foam to protect the foam from the surrounding environment. In the absence of coolant channels, surface damage to the erosion coating may result in a catastrophic loss of cooling air due to the high coolant pressure drop of such a system. Rather than continuing to flow within the foam, the coolant may escape through the region of the foam experiencing the damage. However, with closely spaced cooling channels, little or no cooling air loss may occur since the pressure drop associated with flowing out the damaged region may be greater than the pressure drop experienced flowing between channels.

The unique combination of thermal protection of underlying structure and surface temperature control characteristic of one or more embodiments of the invention may result in several advantages including structural weight reduction due to the elimination of heavy cooling plenum liners and the use of a lightweight polymer composite as a wall material, cost savings due to the elimination of expensive, high temperature structures, performance increases due to the reduction of the coolant required to control surface temperature thereby allowing the coolant to be utilized for other purposes (such as higher air vehicle thrust), and/or other types of advantages.

It should be understood, of course, that the foregoing relates to exemplary embodiments of the invention and that modifications may be made without departing from the spirit and scope of the invention as set forth in the following claims.

We claim:

1. A combined thermal protection and surface temperature control apparatus comprising:
   a porous member comprising an entrance side, a separate exit side, and pores substantially in the size range of 5 to 50 microns;
   one or more coolant entrance channels extending through said entrance side, extending part-way through said porous member, and ending within said porous member before reaching said exit side; and
   one or more coolant exit channels beginning within said porous member, extending through a portion of said porous member, and extending through said exit side;
   wherein the porous member has a thermal conductivity at least as low as 0.046 BTU/hr-ft-° R at room temperature and is configured so that when coolant flows into the one or more coolant entrance channels, coolant will flow from the one or more coolant entrance channels, through the pores of the porous member which are disposed between the one or more coolant entrance channels and the one or more coolant exit channels, into the one or more coolant exit channels, and out of the one or more coolant entrance channels while substantially restricting the flow of coolant through other areas of the porous member.

2. The apparatus of claim 1, wherein said porous member comprises a porous foam.

3. The apparatus of claim 2, wherein said porous foam comprises a high porosity foam with microchannel pore sizes.

4. The apparatus of claim 3, wherein said foam is a hyperporous, microchannel, alumina silica foam.

5. The apparatus of claim 2, wherein the density of said foam is approximately 16 pounds per cubic foot.

6. The apparatus of claim 2, wherein the porosity of said foam is substantially in excess of 80 percent.

7. The apparatus of claim 2, wherein said foam comprises a hyperporous, microchannel, alumina silica foam having a density of approximately 16 pounds per cubic foot, a porosity of approximately 90 percent, and a pore size of approximately 35 microns.

8. The apparatus of claim 1, wherein there are a plurality of coolant entrance channels and a plurality of coolant exit channels.

9. The apparatus of claim 8, wherein said plurality of coolant entrance and exit channels are parallel and alternate.

10. The apparatus of claim 1, wherein said porous member is attached to a second member requiring at least one of thermal protection or surface temperature control.

11. The apparatus of claim 10, wherein said porous member is attached to said second member utilizing a silicone adhesive.

12. The apparatus of claim 11, wherein said second member comprises a portion of at least one of an aircraft, or a spacecraft.

13. The apparatus of claim 1, wherein at least one side of said porous member is coated with an erosion coating.

14. The apparatus of claim 1, wherein a coolant is flowing from the one or more coolant entrance channels, through the pores of the porous member which are disposed between the one or more coolant entrance channels and the one or more coolant exit channels, into the one or more coolant exit channels, and out of the one or more coolant entrance channels with the flow of the coolant being substantially restricted through the other areas of the porous member, said coolant comprising at least one of a gas or a fluid.

15. The apparatus of claim 1, wherein at least one of a height dimension of said entrance and exit channels, a spacing distance between said entrance and exit channels, or another spacing distance between said entrance and exit channels and a surface of said porous member, is pre-determined based on the amount of thermal protection or surface temperature control required.

16. The apparatus of claim 1, wherein a plurality of the thermal protection apparatus are attached together.

17. The apparatus of claim 16, wherein said plurality of thermal protection apparatus are bonded together.

18. The apparatus of claim 16, wherein said entrance channels of a first attached combined thermal protection and surface temperature control apparatus are aligned with said exit channels of a second attached combined thermal protection and surface temperature control apparatus, and said exit channels of said first attached combined thermal protection and surface temperature control apparatus are aligned with said entrance channels of said second attached thermal protection and surface temperature control apparatus.

19. The apparatus of claim 1, wherein the porous member is self-contained to self-channel coolant within the porous member using only the porous member without using a secondary plenum.

20. The apparatus of claim 19, wherein one side of said porous member is attached to a second member requiring at least one of thermal protection or surface temperature control, and an opposed side of the porous member is coated with an erosion coating.

21. The apparatus of claim 20, wherein the second member comprises a portion of at least one of an aircraft, or a spacecraft.

22. The apparatus of claim 1, wherein said porous member is configured to cool a second member, requiring at least one of thermal protection or surface temperature control, at either of opposed sides of the porous member.

23. The apparatus of claim 1 wherein opposed sides of said porous member are each configured to cool separate members requiring at least one of thermal protection or surface temperature control.

24. An aircraft or spacecraft comprising a plurality of the combined thermal protection and surface temperature control apparatus of claim 1.

25. A method of cooling an aircraft or spacecraft, comprising flowing a coolant through the coolant entrance and exit channels of the apparatus of claim 1.

26. A thermally protected, controlled surface temperature apparatus comprising:
   a member requiring thermal protection;
   a porous member comprising an attachment side, a separate entrance side, a separate exit side, and pores substantially in the size range of 5 to 50 microns, wherein said attachment side of said porous member is attached to said member;
   one or more coolant entrance channels extending through said entrance side, extending part-way through said porous member, and ending within said porous member before reaching said exit side; and
   one or more coolant exit channels beginning within said porous member, extending through a portion of said porous member, and extending through said exit side;
   wherein the porous member has a thermal conductivity at least as low as 0.046 BTU/hr-ft-° R at room temperature and is configured so that when coolant flows into the one or more coolant entrance channels, coolant will flow from the one or more coolant entrance channels, through the pores of the porous member which are disposed between the one or more coolant entrance channels and the one or more coolant exit channels, into the one or more coolant exit channels, and out of the one or more coolant entrance channels while substantially restricting the flow of coolant through other areas of the porous member.

27. The apparatus of claim 26, wherein said member requiring thermal protection is a portion of at least one of an aircraft, or a spacecraft.

28. The apparatus of claim 26, wherein said porous member comprises a foam.

29. The apparatus of claim 28, wherein said foam is of high porosity with microchannel pore sizes.

30. The apparatus of claim 28, wherein said foam comprises a hyperporous, microchannel, alumina silica foam having a density of approximately 16 pounds per cubic foot, a porosity of approximately 90 percent, and a pore size of approximately 35 microns.

31. The apparatus of claim 26, wherein said attachment side of said porous member is attached to said member requiring thermal protection using an adhesive.

32. The apparatus of claim 26, wherein said coolant entrance and exit channels are parallel and alternate with respect to one another.

33. The apparatus of claim 26, wherein at least one side of said porous member is coated with an erosion coating.

34. The apparatus of claim 26, wherein at least one of a height dimension of said entrance and exit channels, a spacing distance between said entrance and exit channels, or another spacing distance between said entrance and exit channels and a surface of said porous member, is pre-determined based on the amount of thermal protection or surface temperature control required.

35. The apparatus of claim 26, wherein a plurality of the porous members are attached together.

36. The apparatus of claim 35, wherein said plurality of porous members are bonded together.

37. The apparatus of claim 35, wherein said entrance channels of a first attached porous member are aligned with said exit channels of a second attached porous member, and said exit channels of said first attached porous member are aligned with said entrance channels of said second attached porous member.

38. The apparatus of claim 26, wherein the porous member is self-contained to channel coolant within the porous member using only the porous member without using a secondary plenum.

39. The apparatus of claim 26 wherein the porous member has another side opposed to said attachment side, wherein the opposed side is configured to cool another member requiring thermal protection.

40. A method of preparing a thermal protection, controlled surface temperature apparatus comprising:
   providing a porous member having pores substantially in the size range of 5 to 50 microns and a thermal conductivity at least as low as 0.046 BTU/hr-ft-° R at room temperature and; and
   manufacturing coolant entrance and exit channels within said porous member, with said coolant entrance channel only extending through one side of said porous member and said coolant exit channel only extending through another side of said porous member, with the porous member manufactured so that when coolant flows into the coolant entrance channel, coolant will flow from the coolant entrance channel, through the pores of the porous member which are disposed between the coolant entrance channel and the coolant exit channel, into the coolant exit channel, and out of the coolant entrance channel while substantially restricting the flow of coolant through other areas of the porous member.

41. The method of claim 40, wherein said porous member comprises a foam.

42. The method of claim 41, wherein said foam is of high porosity with microchannel pore sizes.

43. The method of claim 41, wherein said foam comprises a hyperporous, microchannel, alumina silica foam having a density of approximately 16 pounds per cubic foot, a porosity of approximately 90 percent, and a pore size of approximately 35 microns.

44. The method of claim 40, wherein a plurality of said coolant entrance and exit channels are manufactured to be parallel and to alternate with respect to one another.

45. The method of claim 40, further comprising the step of determining a second member which requires thermal protection.

46. The method of claim 45, further comprising the step of determining at least one of a height dimension of said entrance and exit channels, a spacing distance between said entrance and exit channels, or another spacing distance between said entrance and exit channels and a surface of said porous member, to provide the amount of thermal protection or surface temperature control required.

47. The method of claim 45, wherein the second member comprises a portion of at least one of an aircraft, or a spacecraft.

48. The method of claim 46, further comprising the step of attaching said porous member to said second member.

49. The method of claim 48, further comprising the step of coating at least one side of the porous member with an erosion coating.

50. The method of claim 48, further comprising the step of flowing coolant into the coolant entrance channel, through the pores of the porous member which are disposed between the coolant entrance channel and the coolant exit channel, into the coolant exit channel, and out of the coolant exit channel, with the flow of the coolant being substantially restricted through the other areas of the porous member, using only the porous member itself without using a secondary plenum.

51. The method of claim 40 further comprising attaching opposed sides of said porous member to separate members requiring at least one of thermal protection or surface temperature control, and flowing the coolant into the coolant entrance channel, through the pores of the porous member which are disposed between the coolant entrance channel and the coolant exit channel, into the coolant exit channel, and out of the coolant exit channel, with the flow of the coolant being substantially restricted through the other areas of the porous member, to provide at least one of thermal protection or surface temperature control to each of the separately attached members.

* * * * *